US010284615B2

(12) United States Patent
Gregotski

(10) Patent No.: US 10,284,615 B2
(45) Date of Patent: May 7, 2019

(54) ENHANCED PLAYLIST DEFINITION AND DELIVERY FOR FAST CHANNEL CHANGE WITH HTTP ADAPTIVE STREAMING

(71) Applicant: General Instrument Corporation, Horsham, PA (US)

(72) Inventor: Mark E Gregotski, Jamison, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 153 days.

(21) Appl. No.: 14/210,292

(22) Filed: Mar. 13, 2014

(65) Prior Publication Data

US 2014/0280781 A1 Sep. 18, 2014

Related U.S. Application Data

(60) Provisional application No. 61/789,478, filed on Mar. 15, 2013.

(51) Int. Cl.
| H04L 29/06 | (2006.01) |
| H04L 29/08 | (2006.01) |
| H04N 21/262 | (2011.01) |
| H04N 21/438 | (2011.01) |
| H04N 21/845 | (2011.01) |
| H04N 21/2343 | (2011.01) |

(52) U.S. Cl.
CPC .............. *H04L 65/60* (2013.01); *H04L 67/06* (2013.01); *H04N 21/23439* (2013.01); *H04N 21/26258* (2013.01); *H04N 21/4384* (2013.01); *H04N 21/8456* (2013.01)

(58) Field of Classification Search
CPC ....... H04N 21/26258; H04N 21/44016; H04N 21/458; H04N 21/23439; H04N 21/858; H04N 21/4332; H04N 21/4622; H04N 21/8456; H04N 21/4384; H04L 65/4084; H04L 65/60; H04L 65/4092; H04L 67/06
See application file for complete search history.

(56) References Cited

U.S. PATENT DOCUMENTS

| 2011/0145858 | A1* | 6/2011 | Philpott | G06Q 30/02 |
| | | | | 725/32 |
| 2011/0320287 | A1 | 12/2011 | Holt et al. | |
| 2012/0047542 | A1* | 2/2012 | Lewis | H04N 21/44016 |
| | | | | 725/97 |

(Continued)

OTHER PUBLICATIONS

PCT Search Report & Written Opinion, RE: Application #PCT/US2014/026876; dated Oct. 23, 2014.

(Continued)

*Primary Examiner* — Scott B Christensen
(74) *Attorney, Agent, or Firm* — Thomas A. Ward

(57) ABSTRACT

An adaptive bit rate system uses adaptive streaming to deliver content to client devices capable of adaptive bit rate streaming. Enhancing or generating compound manifest files for delivery to clients in an adaptive streaming environment permits a direct acquisition of media segments to services not currently being viewed. For example, the compound playlist can be designed to offer direct access to neighboring channels or other services in the same genre. These novel enhancements to the manifest files may reduce channel change times as well as the efficient delivery of manifest files.

17 Claims, 3 Drawing Sheets

(56) References Cited

U.S. PATENT DOCUMENTS

| | | | | |
|---|---|---|---|---|
| 2012/0254365 A1* | 10/2012 | Adimatyam | ........ | H04L 65/4084 709/219 |
| 2013/0282915 A1* | 10/2013 | Patel | ....................... | H04L 65/60 709/231 |
| 2014/0026052 A1* | 1/2014 | Thorwirth | ................. | G06F 3/01 715/721 |

OTHER PUBLICATIONS

PCT Invitation to Pay Additional Fees (PCT/ISA/206), RE: Application #PCT/US2014/026876; dated Aug. 7, 2014.
Examination Report, Re: European Application No. 14722863.9, dated Apr. 6, 2017.

\* cited by examiner

ENHANCED PLAYLIST DEFINITION AND DELIVERY FOR FAST CHANNEL CHANGE WITH HTTP ADAPTIVE STREAMING

CROSS-REFERENCE TO RELATED APPLICATION

The present application claims priority from U.S. Provisional patent application Ser. No. 61/789,478 filed on Mar. 15, 2013, entitled "Enhancing Playlist Definition and Delivery for Fast Channel Change with HTTP Adaptive Streaming," which is incorporated herein by reference in its entirety.

BACKGROUND

The advent of adaptive bitrate streaming via protocols, such as Hypertext Transfer Protocol (HTTP) Live Streaming (HLS), Smooth Streaming and Moving Picture Experts Group (MPEG) Dynamic Adaptive Streaming over HTTP (DASH) allow content delivery over unmanaged networks to be viewed by client devices under varying network conditions. If the network conditions deteriorate for an appreciable period of time, clients can access lower bandwidth representations of the content without a loss of service. In adaptive streaming, multiple bitrate representations of the content are made available on HTTP streaming servers. The client is able to 'pull' content from HTTP servers based on the condition of the network and available bandwidth the client can ingest.

It is desirable to improve upon the manner in which a client requests and receives playlist files using adaptive streaming. In adaptive streaming environments, a client is able to locate media of a live service by requesting a manifest or playlist associated with that particular service. Typically in an HTTP Live Streaming (HLS) environment, a client requests the 'high-level' playlist file (.m3u8) and depending on available bandwidth, requests the 'low-level' playlist containing the 'bandwidth appropriate' representations of the media. From this 'low-level' playlist file, the uniform resource identifier (URI) of the current media segment is requested (via an HTTP Get or Byte-Range Get).

Most commonly, efforts to reduce channel change times are focused on Internet protocol television (IPTV) Internet Protocol (IP) multicast environment with unicast bursts of IP media. With the popularity of adaptive bitrate streaming techniques, reduction of channel tune times are focused on optimized signaling methods.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

DETAILED DESCRIPTION

Disclosed are techniques for enhancing or generating compound manifest files delivered to clients in an adaptive streaming environment that permits the direct acquisition of media segments via HTTP to services not currently being viewed. For example, the compound playlist can be designed to offer direct access to neighboring channels or other services in the same genre. These novel enhancements to the manifest files may reduce channel change times as well as the efficient delivery of playlist files. As disclosed, a client may efficiently select other services, via HTTP Gets of URIs, delivered synchronously with the playlists of the currently viewed service to affect faster channel change times. The delivery of optimized playlists containing a limited number of URIs for other services requires only a very minimal increase in bandwidth and is virtually negligible in size when compared to sizes of media files. In adaptive streaming environments, this disclosure permits a method for fast acquisition of media segments associated with different services (a Fast Channel Change for adaptive streaming).

In embodiments, a compound/enhanced playlist (or manifest file) is generated. A manifest file is commonly created by a software packager to list the contents of a distribution. The file enumerates the files included in the distribution, for processing by various packaging tools or for human consumption, for example. Disclosed are manners for generating a compound/enhanced manifest file. For example, a system may have a channel up or channel down option associated with a manifest file. When a user plays a service and receives manifest files and media segments, the manifests in the disclosed embodiments include information about both the playlist and chunks of data related to the channel up and channel down. Thus, the user may get a high level manifest file for channel 1, that include second level manifest files related to channel up and down. Then the requested media files are received to play content. Rather than requiring the user to get another high level manifest file to perform a change in service (e.g., channel up or channel down), an enhanced manifest file may be augmented/compounded with information about a plurality of services, not just one. Thus, the manifest file is configured with information for other services/channels.

Figure 1:
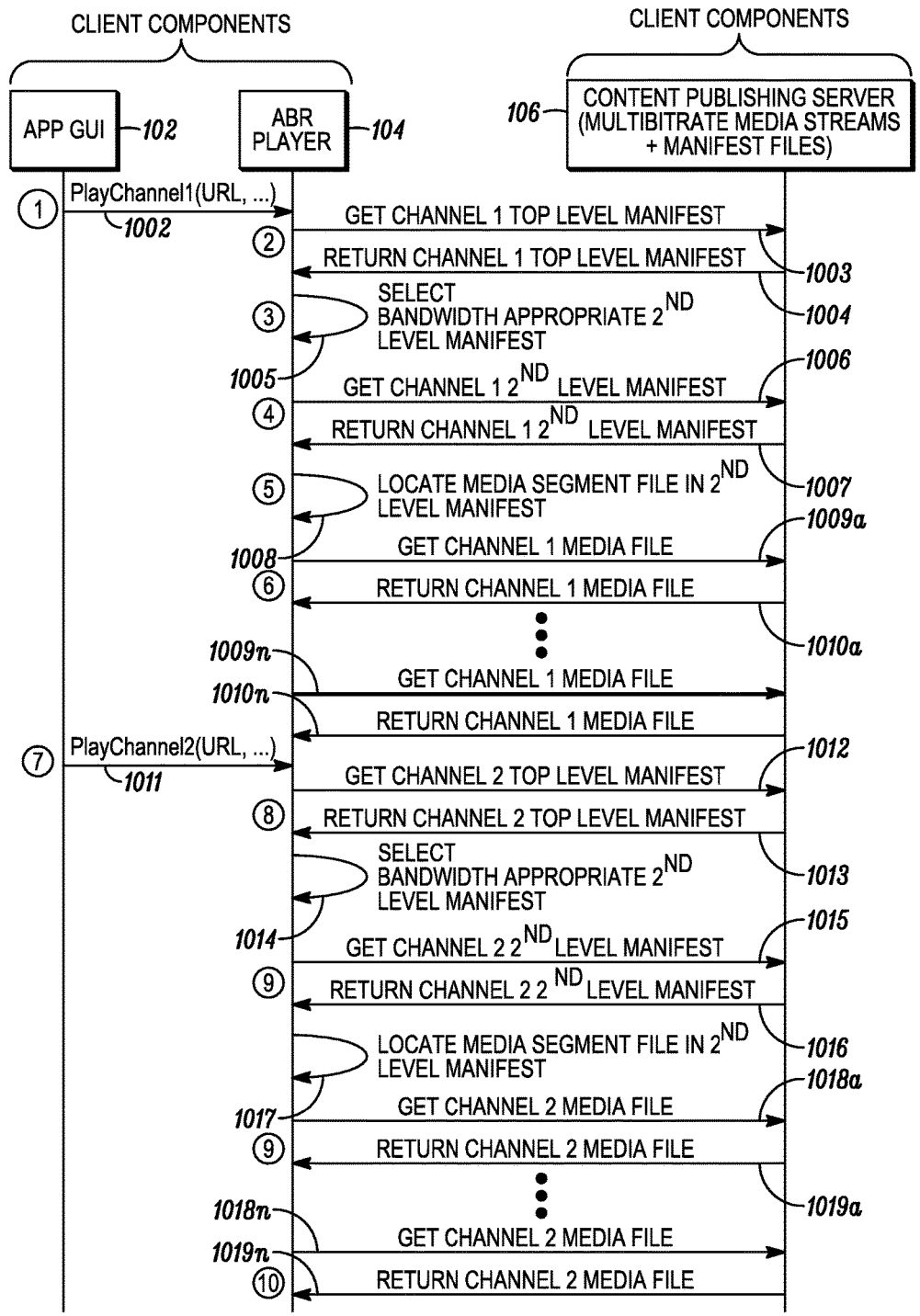
FIG. 1 illustrates an example adaptive bitrate (ABR) streaming client-server message flow and channel change.
Figure 2:
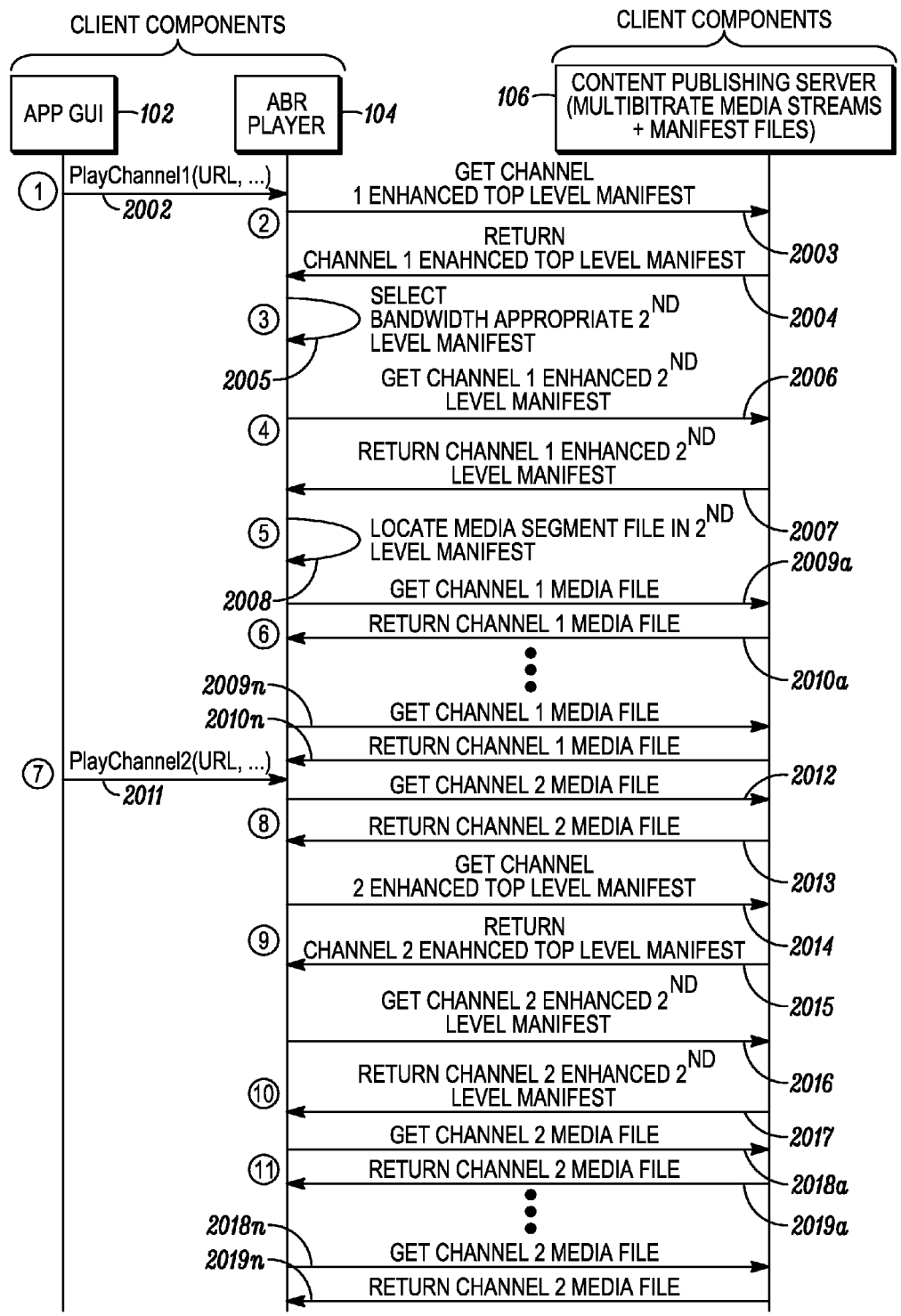
FIG. 2 illustrates an example adaptive bitrate (ABR) streaming client-server message flow and channel change with enhanced manifest files.

FIGS. 1 and 2 provide visual depictions of adaptive streaming message flow diagrams according to the disclosed techniques.

FIG. 1 illustrates example points 1-10 in a typical adaptive bitrate (ABR) streaming client-server message flow and channel change. This diagram shows at a high-level, the message flows for typical adaptive streaming and a channel change. Flows related to security between the client and key server have been omitted for clarity.

① Via an application graphical user interface (GUI) 102, a user can navigate through media content and select an asset for viewing. For example, the user may navigate through movie listings via the application GUI 102 and selects an asset for viewing on Channel 1. The asset is linked at 1002 to a uniform resource identifier (URI) pointing to a high level playlist.

② The ABR player 104 requests, at 1003, the top level manifest file for the asset related to channel 1 from a server, such as content publishing server 106. In response, the ABR player 104 receives, at 1004, the top level manifest file for the asset related to Channel 1, which contains information about the adaptive bitrate profiles and links to the manifests corresponding to each media bandwidth representation.

③ The ABR player 104 reads the high level manifest received at 1004 and at 1005 selects a bandwidth appropriate for a second manifest file, such as selecting the lowest bandwidth for the manifest file or performing bandwidth availability estimation to select a corresponding bandwidth for the manifest file.

④ At 1006, the ABR player 104 requests the second level manifest file based on the bandwidth selected at 1005. At 1007, the ABR player receives the second level manifest for the corresponding bandwidth.

⑤ At 1008, the ABR player 104 determines a location of the media segment file in the second level manifest.

⑥ The ABR player 104 sends a request at 1009a-1009n to the content publishing server 106 for each of the respective Channel 1 media files in succession. In response, the content publishing server sends each of the Channel 1 media files at 1010a-n for each request 1009a-n, respectively, and the ABR player 104 in turn receives at 1010a-n the Channel 1 media files in succession.

⑦ Via the application GUI 102, the user chooses again to navigate through movie listing and selects a second asset for viewing (e.g., an asset on Channel 2). The asset is linked to a URI pointing to a high level playlist at 1011.

⑧ The ABR player 104 requests at 1012 the top level manifest file for the asset related to Channel 2 form the content publishing server 106. In response, the content publishing server 106 sends the top level manifest file for the asset related to Channel 2 to the ABR player 104, which receives it at 1013. The top level manifest file sent/received at 1013 contains information about the adaptive bitrate profiles and links to the manifests corresponding to each media bandwidth representation. As performed at 1005, the ABR player 104 at 1014 selects a bandwidth appropriate for a second manifest file, such as selecting the lowest bandwidth for the manifest file or performing bandwidth availability estimation to select a corresponding bandwidth for the manifest file.

⑨ At 1015 and 1016, the ABR player 104 requests and receives, respectively, the second level manifest for the corresponding bandwidth as sent by the content publishing server 106. At 1017, the ABR player 104 determines a location of the media segment file in the second level manifest related to Channel 2.

⑩ As performed in response to the user's request for the asset on Channel 1, described above, in response to the user's request for the asset on Channel 2, the ABR player 104 requests and receives, at 1018a-n and 1019a-n, Channel 2 media files in succession. ABR player 104 sends a request at 1018a-n from the content publishing server 106 for each of the respective Channel 2 media files in succession. In response, the content publishing server sends each of the Channel 2 media files at 1019a-n for each request 1018a-n, respectively, and the ABR player 104 in turn receives at 1019a-n the Channel 1 media files in succession.

FIG. 2 depicts at points 1-10 an example of ABR Streaming Client-Server Message Flows and Channel Change with Enhanced Manifest Files. FIG. 2 shows, at a high-level, the message flows for a fast channel change in an ABR environment. In embodiments, the ABR Player 104 must recognize proprietary 'tags' in the enhanced High Level and second Level manifest files to determine that other media information and segmented files are directly available.

① Via an application GUI 102, a user can navigate through media content and select an asset for viewing. For example, the user may navigate through movie listings and select an asset for viewing on Channel 1. The asset is linked at 2002 to a URI pointing to an enhanced high level playlist.

② The ABR player 104 requests, at 2003, the enhanced top level manifest file for the asset related to Channel 1 from a server, such as the content publishing server 106. In response, the ABR player 104 receives, at 2004, the enhanced top level manifest file for the asset related to Channel 1, which contains information about the adaptive bitrate profiles and links to the manifests corresponding to each media bandwidth representation, as well as a proprietary playlist tag indicating the presence of extra program manifest files.

③ The ABR player 104 reads the enhanced high level manifest at 2004 and at 2005 selects a bandwidth appropriate for the enhanced high level manifest file, such as selecting the lowest bandwidth manifest file or optionally performs bandwidth availability estimation and selects the corresponding bandwidth manifest file.

④ At 2006, the ABR player 104 requests/receives the enhanced second level manifest for the corresponding bandwidth selected at 2005. At 2007, the ABR player 104 receives the enhanced second level manifest for the corresponding bandwidth.

⑤ At 2008, the ABR player 104 determines a location of the media segment file in the enhanced second level manifest.

⑥ The ABR player 104 sends a request(s) at 2009a-n to the content publishing server 106 for each of the respective, Channel 1 media files, as identified in the manifest, in succession. In response, the content publishing server 106 sends each of the Channel 1 media files at 2010a-n for each corresponding request 2010a-n, respectively, and the ABR player 104 in turn receives at 2010a-n the Channel 1 media files in succession.

⑦ Via the application GUI 102, the user chooses again to navigate through movie listing and selects a second asset for viewing (e.g., an asset on Channel 2).

⑧ The ABR player 104 at 2012 requests the Channel 2 media file based on the previously received 2n d level manifest file because the Channel 2 media files are already included in the previously retrieved second level enhanced manifest. In response, the ABR player 104 receives at 2013 the Channel 2 media file directly based on the enhanced second level manifest received at 2004. Thus, the ABR player 104 is able to bypass the need to access manifest files because the current Channel 2 media files are included in the previously retrieved second level enhanced manifest.

⑨ While the Channel 2 media segments received at 2013 are being downloaded and played, in the background the enhanced second level manifest for Channel 2 is acquired at 2015 in response to a request from the ABR player 104 at 2014.

⑩ Further, while the Channel 2 media segments are being downloaded and played, in the background the enhanced top level manifest for Channel 2 is acquired at 2017 in response to a request from the ABR player 104 at 2016.

⑪ The ABR player 104 continues to request/receive at 2018*a-n* and 2019*a-n*, respectively, the Channel 2 media files in succession.

In HLS embodiments, the URI for a given live service points to an .m3u8 file. This high-level playlist file may contain URIs to lower level playlists containing different representations of segmented or chunked media.

For embodiments related to live/linear adaptive bitrate services, a 'sliding window' of available media segments may be made available to a player. The older or 'stale' media segments are deleted from the playlist as the linear service progresses.

By way of example, a basic variant playlist and a live playlist are sample linear HLS playlists described below.

With respect to the basic variant playlist, a variant is a version of a stream at a particular bit rate. Each variant has a separate playlist. The high-level variant playlist describes all of the available variants. The client will switch to the most appropriate variant based on the measured network bit rate. The client player is tuned to minimize stalling of playback in order to give the user the best experience possible when streaming.

Basic Variant Playlist:

```
#EXTM3U
#EXT-X-STREAM-INF:PROGRAM-ID=1,
BANDWIDTH=150000,RESOLUTION=416x234, \
CODECS="avc1.42e00a,mp4a.40.2"
http://example.com/low/index.m3u8
#EXT-X-STREAM-INF:PROGRAM-ID=1,
BANDWIDTH=240000,RESOLUTION=416x234, \
CODECS="avc1.42e00a,mp4a.40.2"
http://example.com/lo_mid/index.m3u8
#EXT-X-STREAM-INF:PROGRAM-ID=1,
BANDWIDTH=440000,RESOLUTION=416x234, \
CODECS="avc1.42e00a,mp4a.40.2"
http://example.com/hi_mid/index.m3u8
#EXT-X-STREAM-INF:PROGRAM-ID=1,
BANDWIDTH=640000,RESOLUTION=640x360, \
CODECS="avc1.42e00a,mp4a.40.2"
http://example.com/high/index.m3u8
#EXT-X-STREAM-INF:PROGRAM-ID=1,
BANDWIDTH=64000,CODECS="mp4a.40.5"
http://example.com/audio/index.m3u8
```

For embodiments related to live/linear adaptive bitrate services, a 'sliding window' of available media segments may be made available to a player.

Live Playlist (Sliding Window):

```
#EXTM3U
#EXT-X-TARGETDURATION:10
#EXT-X-VERSION:3
#EXT-X-MEDIA-SEQUENCE:1
#EXTINF:10,
fileSequence1.ts
#EXTINF:10,
fileSequence2.ts
#EXTINF:10,
fileSequence3.ts
#EXTINF:10,
fileSequence4.ts
#EXTINF:10,
fileSequence5.ts
```

In order to make available to an adaptive streaming client the playlists and URIs of other services of interest, a 'compound' playlist is proposed that delivers this information to a client when they are viewing a service. The bandwidth overhead in providing expanded, compound playlists is very small, especially when compared to trying to stream video segments of other services concurrently with the service being viewed.

The other services included in the compound playlist can be generated based on the currently viewed service (for example, such as providing playlist information channel up/down, or other services in the same genre). The compound playlist is generated by a 'packaging' device and is retrieved by the adaptive streaming client via HTTP.

With the associated service URIs 'pre-delivered' to the client; the client can directly perform an HTTP GET to an associated media segment of another service.

Proprietary tags can be used to indicate the presence of other services and URIs to the client player.

When the client directly retrieves a media URI for a different service and begins to play the new service media, the basic variant playlist and live—sliding window—playlist can be retrieved.

An example implementation is provided which is not intended to limit the generality of the invention. The playlists used are based on Apple HLS, but the invention could be used for Smooth Streaming, HTTP Dynamic Streaming, and MPEG DASH.

Basic Variant Playlist

```
#EXTM3U
#EXT-X-STREAM-INF:PROGRAM-ID=4,
BANDWIDTH=150000,RESOLUTION=416x234, \
CODECS="avc1.42e00a,mp4a.40.2"
http://example.com/low/index.m3u8
#EXT-X-STREAM-INF:PROGRAM-ID=4,
BANDWIDTH=240000,RESOLUTION=416x234, \
CODECS="avc1.42e00a,mp4a.40.2"
http://example.com/lo_mid/index.m3u8
#EXT-X-STREAM-INF:PROGRAM-ID=4,
BANDWIDTH=440000,RESOLUTION=416x234, \
CODECS="avc1.42e00a,mp4a.40.2"
http://example.com/hi_mid/index.m3u8
#EXT-X-STREAM-EXTRA-PROGRAMS: 2
```

Note the addition of a proprietary tag indicating that additional services are associated with the high-level and bandwidth specific versions of the manifest/playlist.

Live Playlist (Sliding Window)

```
#EXTM3U
#EXT-X-CURRENT-SERVICE
#EXT-X-TARGETDURATION:10
#EXT-X-VERSION:3
#EXT-X-MEDIA-SEQUENCE:1
#EXTINF:10,
program1/fileSequence1.ts
#EXTINF:10,
program1/fileSequence2.ts
#EXTINF:10,
program1/fileSequence3.ts
#EXTINF:10,
program1/fileSequence4.ts
#EXTINF:10,
program1/fileSequence5.ts
#EXT-X-CURRENT-SERVICE-1
#EXT-X-TARGETDURATION:10
#EXT-X-VERSION:3
#EXT-X-MEDIA-SEQUENCE:1
#EXTINF:10,
program2/fileSequence1.ts
#EXTINF:10,
program2/fileSequence2.ts
#EXTINF:10,
program2/fileSequence3.ts
#EXTINF:10,
```

-continued

```
program2/fileSequence4.ts
#EXTINF:10,
program2/fileSequence5.ts
#EXT-X-CURRENT-SERVICE-2
#EXT-X-TARGETDURATION:10
#EXT-X-VERSION:3
#EXT-X-MEDIA-SEQUENCE:1
#EXTINF:10,
program0/fileSequence1.ts
#EXTINF:10,
program0/fileSequence2.ts
#EXTINF:10,
program0/fileSequence3.ts
#EXTINF:10,
program0/fileSequence4.ts
#EXTINF:10,
program0/fileSequence5.ts
```

In this example, the high-level basic playlist signals the presence of additional services (#EXT-X-STREAM-EX-TRA-PROGRAMS: 2 tag). In this example, the additional services may reflect the current channel+1 (#EXT-X-CURRENT-SERVICE-1) and current channel−1 (#EXT-X-CURRENT-SERVICE-2) in the list of available services to the client. If the client wants to access one of these other services, it can directly retrieve the media file of that service via an HTTP Get with the media sequence. This saves the extra messaging associated with locating and retrieving the high-level playlist and then retrieving the bandwidth appropriate media file.

In order to achieve faster access to the new channel, the lowest bandwidth representations can be included in the Live Playlist sliding window of the additional services. These additional services would be advertised in all of the bandwidth representations of the playlist currently being viewed.

Note that this rudimentary example implementation could be more sophisticated to include the presence of media segment URIs pertaining to the same genre of service currently being viewed or even user favorite services. This information would have to be configured in the software packager so it would be capable of creating the playlists with some configurable number of channel-up/down services, genres or favorites.

The playlist proprietary tags used in this example are very rudimentary and could be more expressive to indicate the types of additional service information provided.

It is noted that the disclosed techniques differ from services that stream multiple services at the same time such that an alternate stream is readily available, if the user decides to switch to the other service. These simultaneous streaming concepts require additional bandwidth to send additional content. A disadvantage of such concept is that the bandwidth of the presently desired content may be compromised. With the disclosed techniques, the information is provided in the manifest file so the manifest file information is available prior to a request for the files/content. The highest level manifest file provides different representations and variations of bandwidth available to the system, determines the system availability, and selects a corresponding bandwidth representation.

The disclosed techniques eliminate the need to request a new manifest file for a new requested service/channel, where the information is included for multiple services/channels in a single manifest file. The disclosure permits fast acquisition of services in an adaptive streaming environment by removing the need to access higher level playlists to locate the URIs for media segments. In addition, it provides for faster acquisition of services without the need to simultaneously stream multiple media segments concurrently. The idea can be applied to an implementation of HLS/HLS+ (SecureMedia). It can also be applied to implementations of MPEG DASH. A packager would create the enhanced manifest files and the adaptive streaming client and would be able to use the additional playlist tags to perform faster channel changes.

In contrast to pulling in additional content, the disclosed techniques contemplate combining manifest files for different services into one "compound" manifest file, such that the client device will not be required to read in another manifest file if the channel is changed. The result of not pulling content offers an increase in channel tune time. While pulling in additional content may provide more improvement to channel change time, the disclosed techniques may use less bandwidth. Thus, the increase in bandwidth efficiency is desirable even if the channel change tune time is somewhat longer (than if the content was pulled already, which requires the additional bandwidth).

Figure 3:
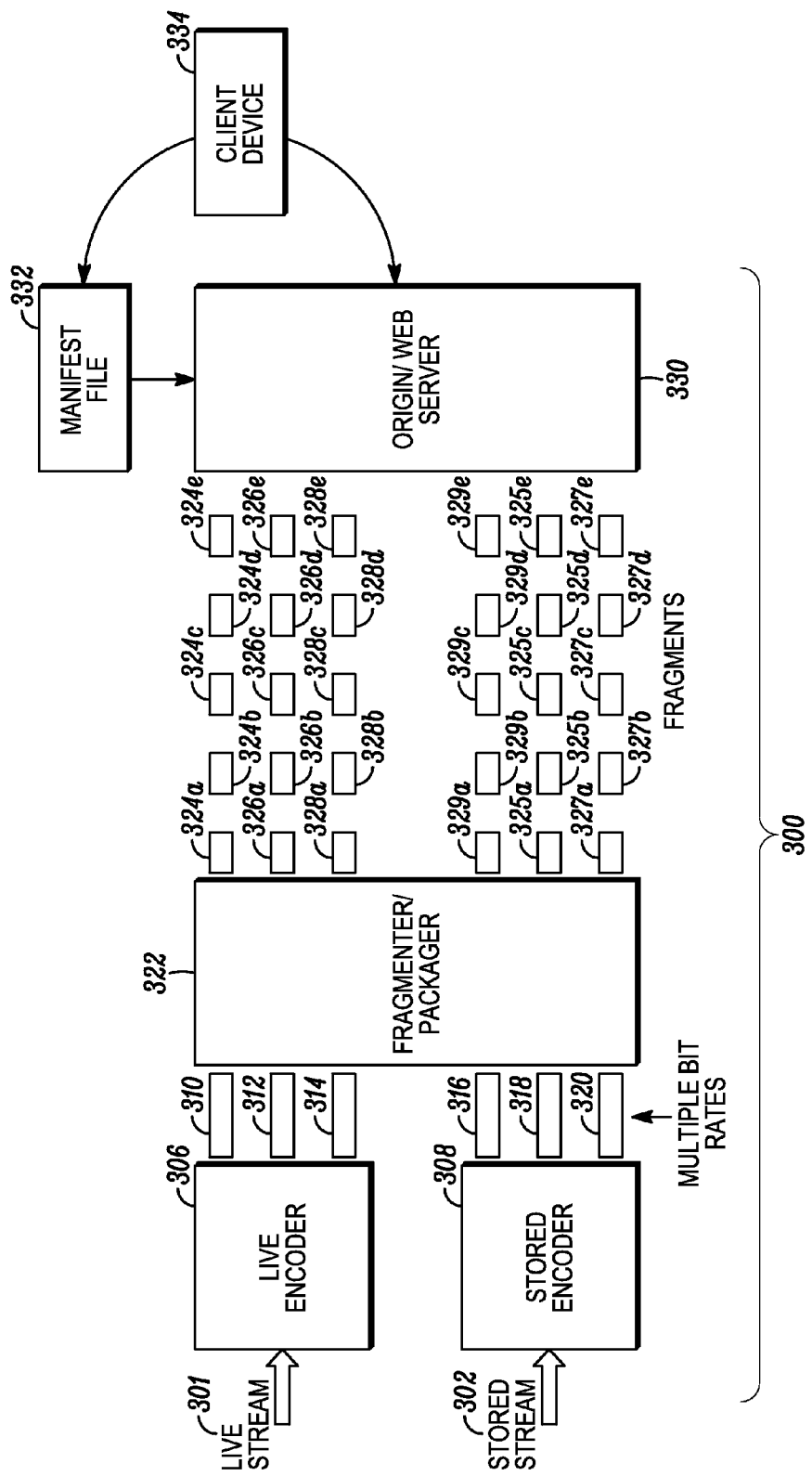
FIG. 3 depicts a high level illustration of a representative adaptive bit rate system It is noted that while the accompanying FIGs. serve to illustrate embodiments of concepts that include the claimed invention, and explain various principles and advantages of those embodiments, the concepts displayed are not necessary to understand the embodiments of the present invention, as the details depicted in the FIGs. would be readily apparent to those of ordinary skill in the art having the benefit of the description herein.

FIG. 3 depicts a high level illustration of a representative adaptive bit rate system that delivers content to a representative adaptive bit rate client device 334. The adaptive bit rate system 300 may include an encoder 306 or 308, a fragmenter 322, and a web server 330 (e.g., HTTP streaming server). The encoder 306, 308 receives inputs (e.g., live stream 301, stored stream 302) from a content source. The encoder encodes one or more versions of the input, and delivers the encoded stream to a packager 322. The packager creates media segments of each encoded stream and outputs the media segments and a manifest file. The media segments may be published to a web server 330. The packager 322 outputs a manifest file 332 via the web server 330 for providing adaptive bit rate metadata to a client device 334. The adaptive bit rate system 300 may deliver the manifest file 332 and corresponding content using adaptive bit rate techniques to an adaptive bit rate client device 334. The adaptive bit rate system 300 may communicate with the client device 334 via an internet protocol content delivery network.

Adaptive bit rate streaming is a technique for streaming multimedia where the source content is encoded at multiple bit rates. As described in more detail below, ABR streaming is based on a series of short progressive downloads that may be applicable to the delivery of both live and on demand content. Adaptive bit rate streaming works by breaking the overall media stream into a sequence of small file downloads, each download loading one short segment, or chunk, of an overall potentially unbounded transport stream.

An adaptive bit rate client device 334 is a client device capable of providing streaming playback by requesting an appropriate series of segments from an adaptive bit rate system 300 over an internet protocol content delivery network (CDN). The representative adaptive bit rate client device 334 shown in FIG. 3 may be associated with a subscriber having a level of subscription, such as a standard subscriber or a premium subscriber, for example.

The adaptive bit rate client device 334 associated with a user or a subscriber may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by ITU-T H.263 (MPEG-2) or ITU-T H.264/MPEG-4, Part 10, Advanced Video Coding (AVC), the High Efficiency Video Coding (HEVC) standard, VP9 (previously Next Gen Open Video (NGOV) and VP-Next), and extensions of such standards, to transmit and receive digital video information more efficiently.

The content provided to the adaptive bit rate system 300 may originate from a live content source (e.g., live stream 301) or a storage device (e.g., stored stream 302). As shown in FIG. 3, the live stream 301 and stored stream 302 may be input to a real-time encoder or an on-demand/stored content encoder 306, 308, respectively. The encoder converts entire content streams into multiple streams at different bit rates. For example, an encoder may receive as an input an MPEG stream (e.g., MPEG-2/MPEG-4) or a stored MPEG stream (e.g., MPEG-2/MPEG-4), encode the MPEG stream digitally, encapsulate the encoded MPEG stream in to MPEG-2 single program transport streams (SPTS) multiple bit rates formats, and prepare the encapsulated media for distribution. The inputs to the encoder may be encoded into one or more transport streams. By way of example, FIG. 3 depicts the live stream 301 encoded into three transport streams, 310, 312, 314, each having a different bit rate, and the stored stream encoded in to three transport streams, 316, 218, and 320, each having a different bit rate.

Generally, an adaptive bit rate packager 322 is responsible for preparing ("packaging") individual adaptive bit rate streams. A packager is designed to fragment, or "chunk," media files and to encapsulate those files in a container expected by the particular type of adaptive bit rate client. As used herein, a chunk is a small file containing a short video segment (typically 2 to 10 seconds) along with associated audio and other data. For example, 'chunks' or 'chunk files' may be short sections of media retrieved in an HTTP request by an adaptive bit rate client. In some cases these chunks may be standalone files, or may be sections (i.e. byte ranges) of one much larger file. For simplicity the term 'chunk' is used to refer to both of these cases (many small files or fewer large files). A chunk is a small file containing a short video segment (typically 2 to 10 seconds) along with associated audio and other data.

As shown in FIG. 3, the resultant transport streams 310, 312, 314, 316, 318, and 320 are passed through the fragmenter 322. The fragmenter 322 reads each encoded stream 310, 312, 314, 316, 318, and 320 and divides them in to a series of fragments of a finite duration. For example, MPEG streams may be divided into a series of 2 to 10 second fragments with multiple wrappers for the various adaptive streaming formats (e.g., Microsoft Smooth Streaming, APPLE HLS). As shown in FIG. 3, the transport streams 310, 312, 314 are fragmented by fragmenter 322 into adaptive bit rate media segments 324a-e, 326a-e, and 328a-e, respectively. The resultant transport streams 316, 318, and 320, are fragmented by fragmenter 322 into adaptive bit rate media segments 330a-e, 332a-e, and 334a-e, respectively. The fragmenter 322 is also referred to herein as a packager, as the packager can include fragmenting the content into fragments and then encrypting each fragment using a content key.

Thus, a whole video may be segmented in to what is commonly referred to as chunks or adaptive bit rate fragments/segments. The adaptive bit rate fragments are available at different bit rates, each of a finite duration. The adaptive bit rate system generates or identifies the media segments of the requested media content as streaming media content. Adaptive streaming may use HTTP as the transport for these video chunks.

The packager 322 can generate a manifest file that represents a playlist. The playlist can be a manifest file that lists the locations of the fragments of the multimedia content. By way of a non-limiting example, the manifest file can comprise a uniform resource locator (URL) for each fragment of the multimedia content. If encrypted, the manifest file can also comprise the content key used to encrypt the fragments of the multimedia content The packager creates the manifest files as the packager performs the chunking operation for each type of adaptive bit rate streaming method. In adaptive bit rate protocols, the manifest files generated may include a variant playlist and a playlist file. The variant playlist describes the various formats (resolution, bit rate, codec, etc.) that are available for a given asset or content stream. For each format, a corresponding playlist file may be provided. The playlist file identifies the media file chunks/segments that are available to the client. It is noted that the terms manifest files and playlist files may be referred to interchangeably herein. The client determines which format the client desires, as listed in the variant playlist, finds the corresponding manifest/playlist file name and location, and then retrieves media segments referenced in the manifest/playlist file.

The packager creates the manifest files to be compliant with an adaptive bit rate streaming format of the associated media and also compliant with encryption of media content under various DRM schemes. Thus, the construction of manifest files varies based on the actual adaptive bit rate protocol. Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

In embodiments, adaptive streaming uses a Hypertext Transfer Protocol (HTTP) as the transport protocol for these video chunks. The adaptive streaming may be based on a series of short Hypertext Transfer Protocol (HTTP) downloads which is applicable to the delivery of both live and on demand content. The ABR system may rely on HTTP as the transport protocol and perform the media download as a series of very small files.

Given the nature of the adaptive bit rate 'pull' model, where the client directly requests and retrieves media content chunks at its own pace as a function of network traffic and other factors, network components may have less control over the streaming of media files compared to traditional video on demand (VOD) streaming systems (be it over QAM or IP network). The net result is the adaptive bit rate client device, which the network operator may not control, is able to dictate the pacing of content.

Further, an implication of adaptive bit rate systems is that the client has by default wide latitude with respect to the client's access to media chunks. For example, the client is generally free to skip around within the asset, fast forward, rewind, pause, jump ahead, without the same control or even knowledge of the network, relative to more traditional video delivery networks (e.g. HFC/QAM-based broadcast or VOD or SDV video services).

As described herein, the packager, such as packager 309 posts the adaptive bit rate chunks, e.g., 324a-e, 325a-e, 326a-e, 327a-e, 328a-e, 329a-e associated with the generated manifest file to an origin server, such as origin server 330. The origin server 330 may include a storage device where audiovisual content resides, or may be communicatively linked to such storage devices; in either case, the origin server 330 is a location from which the content can be accessed by the adaptive bit rate client devices 334. The origin server 330 may be deployed to deliver content that does not originate locally in response to a session manager.

The origin server 330 includes components that together make up a custom playlist from the collections of chunks. For example, for chunks of AV data that each has a unique URI, the custom playlist can be a collection of URIs that constitute the complete program (or as disclosed herein, a portion of the program). As will be explained herein, the custom playlist may omit or alter chunks that contain AV content that is not in compliance with a rule set applied by the filter, e.g., non-compliant AV content that is deemed objectionable in a personalized rule set.

Playback at the adaptive bit rate client device 334 of the content in an adaptive bit rate environment, therefore, is enabled by the playlist or manifest file 332 that directs the adaptive bit rate client device to the media segment locations, such as a series of uniform resource identifiers (URIs). For example, each URI in a manifest file is usable by the client to request a single HTTP chunk. The manifest file may reference live content or on demand content. Other metadata also may accompany the manifest file.

At the start of a streaming session, the adaptive bit rate client device 334 receives the manifest file 332 containing metadata for the various sub-streams which are available. Upon receiving the manifest file, the subscriber's client device 334 parses the manifest file and determines the chunks to request based on the playlist in the manifest file. The adaptive bit rate client device 334 can fetch a first media segment posted to an origin server for playback. For example, the user may use HTTP Get or Byterange requests to request media segments. Then, during playback of that media segment, the playback device may fetch a next media segment for playback after the first media segment, and so on until the end of the media content. This process may continue for as long as the asset is being played (until the asset completes or the user tunes away). Note that for live content especially, the manifest file will continually be updated as live media is being made available. These live playlists may also be referred to as sliding window playlists.

In HLS, for example, the adaptive bit rate system 100 receives a media request from a subscriber 334 and generates or fetches a manifest file to send to the subscriber's playback device in response to the request. A manifest file can include links to media files as relative or absolute paths to a location on a local file system or as a network address, such as a URI path. In HLS, an extended m3u format is used as a non-limiting example to illustrate the principles of manifest files including non-standard variants.

The client device may request fragments of video from the server for playback at the client device. Since adaptive bit rate fragments are available on the server in one of several bit rates, the client may switch bit rates at the fragment boundaries. Thus, the client can adjust its request for the next fragment. The result is a system that can dynamically adjust to varying network congestion levels. Often, the quality of the video stream streamed to a client device is adjusted in real time based on the bandwidth and CPU of the client device. For example, the client may measure the available bandwidth and request a fragment that best matches a measured available bit rate.

Since adaptive bit rate media segments are available on the adaptive bit rate system in one of several bit rates, the client may switch bit rates at the media segment boundaries. Using the manifest file to adaptively request media segments allows the client to gauge network congestion and apply other heuristics to determine the optimal bit rate at which to request the media presentation segments/fragments from one instance in time to another. As conditions change the client is able to request subsequent fragments/segments at higher or lower bitrates. Thus, the client can adjust its request for the next segment. The result is a system that can dynamically adjust to varying network congestion levels. Often, the quality of the video stream streamed to a client device is adjusted in real time based on the bandwidth and CPU of the client device. For example, the client may measure the available bandwidth and request an adaptive bit rate media segment that best matches a measured available bit rate.

The adaptive bit rate system 300 receives content from a content source, represented such as a live content source providing live stream 301 or a VOD server providing stored stream 302. When a subscriber requests content from a respective adaptive bit rate client device, e.g., client device 334, the content may be retrieved from any one of a live content backbone, network digital video recorder (nDVR) content storage, or video on demand (VOD) content storage. The live content source may be any number of possible cable or content provider networks and manners for distributing content (e.g., satellite, fiber, the Internet, etc.). The example live content source is a non-limiting example of a content source for adaptive bit rate streaming, which may include any number of multiple service operators (MSOs) or Telcos, such as cable and broadband service providers who provide both cable and Internet services to subscribers, and operate content delivery networks in which Internet Protocol (IP) is used for delivery of television programs (i.e., IPTV) over a digital packet-switched network. The live stream 301 may be a broadcast of multimedia content from a content provider. The stored stream 302 may be on demand content, for example. The adaptive bit rate system may include an interface provided to subscribers to select video or audio content.

The components between the content source and the content delivery network may be located in a headend or other suitable location within a content provider network. A cable television headend is a master facility for receiving television signals for processing and distributing content over a cable television system. The headend typically is a regional or local hub that is part of a larger service provider distribution system, such as a cable television distribution system. An example is a cable provider that distributes television programs to subscribers, often through a network of headends or nodes, via radio frequency (RF) signals transmitted through coaxial cables or light pulses through fiber-optic cables. In embodiments, content is received at the headend from a content source (such as a content server of a program provider).

In embodiments, the adaptive bit rate system 300 may deliver live content to adaptive bit rate client devices 334 over the internet protocol content delivery network (IP CDN). A subscriber may request a live stream, a video on demand asset, or a network DVR asset over the content delivery network (CDN). Examples of a content delivery network include networks comprising, for example, managed origin and edge servers or edge cache/streaming servers. The content delivery servers, such as edge cache/streaming server, deliver content and manifest files (e.g., via one or more wired and/or wireless telecommunication networks, not pictured) to IP subscribers 334. In an illustrative example, a content delivery network comprises an access network that includes communication links connecting origin servers to the access network, and communication links connecting distribution nodes and/or content delivery servers to the access network. Each distribution node and/or content delivery server can be connected to one or more adaptive bit rate client devices; e.g., for exchanging data with and delivering content downstream to the connected IP client devices. The access network and communication links of content delivery network can include, for example, a transmission medium such as an optical fiber, a coaxial cable, or other suitable transmission media or wireless telecommunications. In an exemplary embodiment, content delivery network comprises a hybrid fiber coaxial (HFC) network.

A network based digital video recorder (nDVR) content storage device may provide content stored at the network via a network based digital video recorder (nDVR) service. An nDVR video asset is stored at the provider's central location rather than at the consumer's private home. Similar to a personal video recorder at the user's home, the nDVR service allows the end user to access recorded programs at will rather than restricted to the scheduling of the live broadcast. However, an nDVR service captures, in the network on a server, real-time broadcast television which can be selected for later playback. Thus, nDVR subscribers can utilize the network for recording content, rather than requiring a local device or local storage. Recordings specifically designated for a particular client are stored in the network. The content provider may utilize a larger number of nDVR servers on which subscribers' media content may be stored. The nDVR content is similar to live content in that the content is packaged for delivery to the user in real time, but playback is expected to be after the fact.

A video on demand (VOD) content storage device represents video and audio content selected by the content provider for availability to a user on demand. Similar to the nDVR service, the VOD service allows the end user to access recorded programs at will rather than restricted to the scheduling of the live broadcast. However, in contrast to content explicitly recorded via a DVR at the request of a subscriber and made available to the requesting subscriber, VOD content is stored content made available by the content provider to subscribers for viewing at their discretion. The VOD content may be available to any subscribers of the content. The content provider's video on demand library can consist of thousands of movies, network and premium television programs, sporting events, children's programming, music videos, weather information, and more.

The content delivery network (CDN) can communicatively couple the origin servers 330 and one or more distribution nodes and/or content delivery servers (e.g., edge servers, or edge cache/streaming servers). The subscriber, via a respective client device 334, is responsible for retrieving the media file 'chunks,' or portions of media files, from the origin server 330 as needed to support the subscriber's desired playback operations. The subscriber may submit the request for content via the internet protocol content delivery network (CDN) that can deliver adaptive bit rate file segments from the service provider or headend to end-user adaptive bit rate client devices.

Adaptive bit-rate streaming is a technique for streaming multimedia where the source content is encoded at multiple bit rates. The use of an adaptive bit rate system that chunks media files allows the client to switch between different quality (size) chunks of a given asset, as dictated by network performance. The client has the capability by using the manifest file, to request specific fragments/segments at a specific bit rate. As the stream is played, the client device may select from the different alternate streams containing the same material encoded at a variety of data rates, allowing the streaming session to adapt to the available network data rate. For example, if, in the middle of a session, network performance becomes more sluggish, the client is able to switch to the lower quality stream and retrieve a smaller chunk. Conversely, if network performance improves the client is also free to switch back to the higher quality chunks.

An adaptive bit rate system such as that shown in FIG. 3 uses adaptive streaming to deliver content to its subscribers. Adaptive bit rate streaming, also known as ABR streaming, is a delivery method for streaming video that may use an Internet Protocol (IP). As used herein, streaming media includes media received by and presented to an end-user while being delivered by a streaming provider using adaptive bit rate streaming methods. Streaming media refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using adaptive bit rate methods are included in the references to "media" and "streaming."

Adaptive bit rate techniques enable the content delivery system to detect a user's bandwidth and optionally other capabilities, such as CPU capacity, in real time and adjust the quality of a video stream accordingly. It uses an encoder which can encode a single source video at multiple bit rates. The client switches between streaming the different encodings depending on available resources. The result: very little buffering, fast start time and a good experience for both high-end and low-end connections.

Thus adaptive bit rate streaming results in an uninterrupted user experience. The client may maintain a temporary cache of a few fragments and requests further fragments at optimally determined rates thus maintaining continuity of playback even through changing network bandwidth conditions.

The origin server 330 may store several chunk sizes for each segment in time. The adaptive bit rate client device predicts the available bandwidth and requests the best chunk size, e.g., using the appropriate URI. Since the client is controlling when the content is requested, this is seen as a client-pull mechanism, compared to a push mechanism where the server pushes the content. Using URIs to create the manifest file enables very simple client devices to retrieve chunks using web browser-type interfaces.

The packager may facilitate adaptive bit rate streaming of video and audio to multi-screen video (MSV) clients. The packager may be a software element residing on a multirate transcoder. The packager may co-exist with a HTTP server, a streaming Edge Server, or may be a standalone appliance. Further the packager may optionally have a built-in content delivery network interface or an HTTP server interface such that it can support clients directly. Direct support of clients may be limited to VoD and nDVR type applications.

The discrete segments may be delivered using common Internet protocols, namely HTTP over TCP/IP, a robust and reliable transfer protocol in which clients request content segments and web servers respond accordingly. Thus, within an embodiment of an adaptive bit rate system, knowledge of all content segments delivered and to whom they are delivered can be provided for use in network-based viewership monitoring.

As described herein, the types of content that the packager may package includes Live Linear, VOD, StartOver, and nDVR. VOD content and nDVR content were described above. Live content are television programs that are watched in real time. This means that packaging must be an ongoing process that occurs simultaneously with playback. StartOver contents are live content whose viewing can be started after the content start time. You can for example at 7:15 PM start watching a 7:00 PM live program.

Per service the packager will be configured to perform segmentation/chunking for either all output adaptive bit rate formats or a subset of the output adaptive bit rate streaming formats. The packager will also create the respective manifest files. The chunk durations may be different for each adaptive bit rate format, but they will all have to be an integer multiple of the GOP size or key frame intervals. However for a given adaptive bit rate format the chunk durations will be the same for all streams in an output stream group.

The packager may be a logical software service which can run on various hardware platforms, located at various points in the network. In general it either resides "in the center" or "at the edge". In a center deployment it may be logically positioned between the Transcoder and the origin server. In an edge deployment it is logically positioned between the origin server and the Edge Server.

HTTP is a manner for retrieving files from the Internet and the technology is built into web browsers. HTTP has more recently become a preferred method to deliver video. It can be used to deliver video in an adaptive streaming manner in which the video is encoded into various bit rates and fragmented for delivery. Algorithms for network congestion or processor utilization are used to determine which bit rate is delivered at what time.

The packager supports adaptive bit rate streaming in any container format tied to an adaptive streaming protocol. Examples include HTTP Live Streaming (Apple—HLS), Internet Information Services—Smooth Streaming (Microsoft—HSS), and HTTP Dynamic Streaming (Adobe—HDS). The container formats have become de-facto industry standards due to their widespread use. The disclosed packager also supports profiles from the MPEG-DASH (Dynamic Adaptive Streaming over HTTP) format, which is a standardized adaptive streaming specification that has been developed as an industry standard by MPEG. This system could be implemented in MPEG DASH without any special logic in the client and most likely in existing proprietary adaptive bit rate schemes. This is a novel use of dynamic manifests to control client behavior.

An illustrative adaptive bit rate streaming system 300 may implement, for example, one or more open or proprietary protocols for adaptive bit rate streaming such as HTTP Live Streaming (HLS), SecureMedia's Encryptonite One HLS+ solution, Microsoft Smooth Streaming, HTTP Dynamic Streaming, Dynamic Adaptive Streaming over HTTP (DASH), HTTP Smooth Streaming (HSS), and the like. The packager converts one or more multi-bit rate streams of an input stream group into logical files formatted for a particular output streaming format such as HLS, HDS, HSS or DASH. In HSS, HDS and DASH all of the chunks associated with a given format and bit rate are stored within the same file. In HLS however, each chunk is stored in its own file. So assuming two second chunks, three bitrates and 30 minute program the packager will create three HSS files but 2700 HLS files. The packager can create multiple formats simultaneously. Each format to be generated is specified by a profile.

Apple HLS breaks the whole content stream in to a sequence of small HTTP based file downloads. As the stream is played, the client selects from a number of different bit rate streams based on the client CPU and bandwidth.

Microsoft HSS is a media services extension to enable adaptive streaming of media to clients over HTTP, using a concept of delivering small content fragments (e.g., 2 seconds video) and verifying that each has arrived within appropriate time and playback at the expected quality level.

Overall quality with adaptive bit rate may be the best possible for a given user's network connection, thereby maximizing the quality of experience.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

I claim:

1. A method performed by a client player for bypassing a manifest file request in an adaptive bit rate system, the method comprising:
   receiving, from a client application, a request for a first media asset from a first channel other than a current channel being viewed related to the first channel;
   requesting, based on the received request, a manifest file associated with the first media asset from an adaptive bit rate server in a content delivery network;
   receiving, from the adaptive bit rate server, a top-level manifest file identifying a second level manifest file containing one or more streams of the first media asset, each second level manifest file associated with a bit rate and identifying media segments for a respective stream;
   requesting, based on the received top-level manifest, a second level manifest file associated with a selected one of the first media asset streams from the adaptive bit rate server in the content delivery network;
   receiving, from the adaptive bit rate server, a second level compound manifest file comprising a plurality of links to media segments, each link corresponding to a file location of a media segment of the selected first media asset stream, and a plurality of links corresponding to file locations of additional media segments associated with at least one non-requested media asset;
   retrieving, based on the second level compound manifest, a media segment associated with the first media asset stream based on a corresponding file location identified in the second level compound manifest file;
   receiving, from the client application, a request for a second media asset from a second channel other than the first channel and the current channel related to the second channel, wherein the links corresponding to file locations of additional media segments includes at least one link to a file location of a media segment of the second media asset from the second channel, such that a pre-delivery of the at least one second media asset link occurs without waiting for receipt of the second compound manifest; and
   retrieving and preloading a media segment associated with the second media asset stream based on a corresponding file location identified in the second level compound manifest file.

2. The method of claim 1, wherein the top-level manifest file indicates a presence of the additional media segments associated with the at least one non-requested asset.

3. The method of claim 1, wherein the first media asset stream is selected from the top level manifest file based on at least one of a lowest level bit rate stream or a stream having a bit rate selected based on an estimation of available bandwidth.

4. The method of claim 3, wherein the plurality of links corresponding to file locations of additional media segments associated with at least one non-requested media asset have a bit rate corresponding to the selected first media access stream.

5. The method of claim 1, wherein a first bit rate version of the first media asset acquired is switchable to a second bit rate version depending on at least one of an available bandwidth or a measured network bit rate.

6. The method of claim 1, wherein a link is at least one of a URI or a URL pointing to a location on at least one of a local file system or a network address for downloading a media segment.

7. The method of claim 1, wherein the plurality of links in the second level manifest files represent a plurality of different representations of segmented media for one or more non-requested media assets.

8. The method of claim 1, further comprising, while downloading the media segment associated with the second media asset, acquiring the compound manifest file for the at least one second asset in the background.

9. The method of claim 8, wherein acquiring the compound manifest file for the at least one second asset in the background comprises, during playback of the media segments of the second media asset retrieved based on the second level compound file already received:
   requesting a new top-level manifest file associated the second media asset, wherein the top-level manifest file associated with the second media asset includes media segments of the second media asset and additional media segments associated with one or more assets other than the second media asset;
   receiving the new top-level manifest file identifying a second level manifest file for each of one or more available streams of the second media asset, each second level manifest file associated with a bit rate and one or more media segments for the respective second media asset stream;
   requesting a new second level manifest file associated with a selected one of the second media asset streams; and
   receiving a new second level compound manifest file comprising a plurality of links to media segments, each link corresponding to a file location of a media segment of the selected second media asset stream, and a plurality of links corresponding to file locations of additional media segments associated with at least one non-requested media asset.

10. The method of claim 9, further comprising retrieving the lowest bit rate versions of the second media asset from the second level compound manifest file, and switching to higher bit rate version when the new second level compound manifest file is received.

11. The method of claim 9, further comprising performing bandwidth availability estimation, and selecting the corresponding bandwidth manifest file for the second media asset.

12. The method of claim 1, wherein for the live play of a media asset, the second level manifest file is continuously updated with available media segments in a sliding window such that stale media segments are deleted from the manifest file as the live play of the media asset progresses.

13. The method of claim 12, wherein in order to achieve faster access to the second channel, the lowest bandwidth representations are included in the sliding window with an indicator of the additional bandwidth representations for which the assets are available.

14. The method of claim 1, wherein the non-requested assets that are represented in the second level compound manifest file are included based on at least one of a currently viewed service, a neighboring channel, or another asset in the same genre.

15. The method of claim 1, wherein the compound playlist is generated by a packaging device in the content delivery network and is retrieved via HTTP.

16. The method of claim 1, wherein, if the media content is available in the compound manifest file, the time for switching between channels is less than time to switch between channels if a new manifest file were requested.

17. An adaptive bit rate player for streaming adaptive bit rate streaming content through a network to a client, the device comprising one or more processors configured for:
receiving, from a client application, a request for a first media asset from a first channel other than a current channel being viewed related to the first channel;
requesting, based on the received request, a manifest file associated with the first media asset from an adaptive bit rate server in a content delivery network;
receiving, from the adaptive bit rate server, a top-level manifest file identifying a second level manifest file containing one or more streams of the first media asset, each second level manifest file associated with a bit rate and identifying media segments for a respective stream;
requesting, based on the received top-level manifest, a second level manifest file associated with a selected one of the first media asset streams from the adaptive bit rate server in the content delivery network;
receiving, from the adaptive bit rate server, a second level compound manifest file comprising a plurality of links to media segments, each link corresponding to a file location of a media segment of the selected first media asset stream, and a plurality of links corresponding to file locations of additional media segments associated with at least one non-requested media asset;
retrieving, based on the second level compound manifest, a media segment associated with the first media asset stream based on a corresponding file location identified in the second level compound manifest file;
receiving, from the client application, a request for a second media asset from a second channel other than the first channel and the current channel related to the second channel, wherein the links corresponding to file locations of additional media segments includes at least one link to a file location of a media segment of the second media asset from the second channel, such that a pre-delivery of the at least one second media asset link occurs without waiting for receipt of the second compound manifest; and
retrieving and preloading a media segment associated with the second media asset stream based on a corresponding file location identified in the second level compound manifest file.

* * * * *